United States Patent
Mayfield et al.

(10) Patent No.: US 10,491,100 B1
(45) Date of Patent: Nov. 26, 2019

(54) COMBINED AC AND DC POWER CONVERTER WITH AN ELECTROMAGNETIC INTERFERENCE FILTER AND A BRIDGE RECTIFIER

(71) Applicant: Rockwell Collins, Inc., Cedar Rapids, IA (US)

(72) Inventors: James B. Mayfield, Cedar Rapids, IA (US); Daniel J. Kaplan, Melbourne Beach, FL (US); Jeffrey J. Deloy, Central City, IA (US); Tristan J. Kendall, Central City, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 6 days.

(21) Appl. No.: 16/050,691

(22) Filed: Jul. 31, 2018

(51) Int. Cl.
| | |
|---|---|
| *H02M 1/10* | (2006.01) |
| *H02M 1/42* | (2007.01) |
| *H02M 1/44* | (2007.01) |
| *H02M 7/219* | (2006.01) |
| *H02M 1/00* | (2006.01) |

(52) U.S. Cl.
CPC .......... *H02M 1/10* (2013.01); *H02M 1/4225* (2013.01); *H02M 1/4233* (2013.01); *H02M 1/44* (2013.01); *H02M 7/219* (2013.01); *H02M 2001/007* (2013.01)

(58) Field of Classification Search
CPC ... H02M 1/10; H02M 2001/007; H02M 7/219
See application file for complete search history.

(56) References Cited

U.S. PATENT DOCUMENTS

| | | | | |
|---|---|---|---|---|
| 5,446,366 | A * | 8/1995 | Bassett | H02M 1/34 323/222 |
| 5,861,734 | A * | 1/1999 | Fasullo | H02M 1/4216 323/222 |
| 6,028,418 | A * | 2/2000 | Jovanovic | H02M 3/158 323/222 |
| 2008/0130336 | A1* | 6/2008 | Taguchi | H02M 1/4225 363/125 |
| 2010/0061122 | A1* | 3/2010 | Okubo | H02M 3/158 363/20 |
| 2014/0185327 | A1* | 7/2014 | Shah | H02M 1/4225 363/16 |
| 2016/0336808 | A1* | 11/2016 | Liu | H02M 7/219 |
| 2018/0287466 | A1* | 10/2018 | Kim | H02P 27/06 |

* cited by examiner

*Primary Examiner* — Yusef A Ahmed
*Assistant Examiner* — Ishrat F Jamali
(74) *Attorney, Agent, or Firm* — Suiter Swantz pc llo

(57) ABSTRACT

A combined alternating current (AC) and direct current (DC) power converter is disclosed. In embodiments, the power converter includes an electromagnetic interference (EMI) filter, a bridge rectifier, and a boost converter. The EMI filter is configured to receive an electrical signal from a power source. The bridge rectifier is coupled to the EMI filter and includes at least four diodes arranged in a diode bridge configuration. The boost converter is coupled to the bridge rectifier and includes a switched DC path and a switched AC path. The switched DC path includes a DC transistor and the switched AC path includes an AC transistor. The switched AC path can also include one or more diodes and/or switching elements.

15 Claims, 7 Drawing Sheets

COMBINED AC AND DC POWER CONVERTER WITH AN ELECTROMAGNETIC INTERFERENCE FILTER AND A BRIDGE RECTIFIER

BACKGROUND

Power supplies are typically designed to handle alternating current (AC) or direct current (DC), but not both. For example, devices for use in an aircraft may be designed to operate off either 28 VDC or 115 VAC aircraft power systems. If operation on both types of aircraft platforms is desired, an increase of development and qualification effort is required. Furthermore, this results in increased production costs because two different device designs need to be produced and stocked. Consequently, there is a need for power supplies or converters that can be powered by both AC and DC power sources.

SUMMARY

In an aspect, embodiments of the inventive concepts disclosed herein are directed to a power converter for alternating current (AC) and direct current (DC) power sources. In embodiments, a combined AC and DC power converter includes an electromagnetic interference (EMI) filter, a bridge rectifier, and a boost converter. The EMI filter is configured to receive an electrical signal from a power source. The bridge rectifier is coupled to the EMI filter and includes at least four diodes arranged in a diode bridge configuration. The boost converter is coupled to the bridge rectifier and includes a switched DC path and a switched AC path. The switched DC path includes a DC transistor and the switched AC path includes an AC transistor. The switched AC path can also include one or more diodes and/or switching elements. In some embodiments, the power converter further includes or is coupled to a mode controller that is configured to enable respective ones of the transistors based upon a DC mode or an AC mode of operation, where the AC transistor and the DC transistor may be controlled through an output of a pulse width modulator (PWM).

In another aspect, embodiments of the inventive concepts disclosed herein are directed to a device that includes a combined AC and DC power converter. In embodiments, the device includes a power supply coupled to the power converter. For example, the power converter can be coupled to or can make up a portion of front-end circuitry of the power supply. The device may further include one or more powered electronic components that are coupled to the power supply.

In another aspect, embodiments of the inventive concepts disclosed herein are directed to a method for converting power from AC and DC power sources with combined AC and DC power conversion circuitry (e.g., utilizing a combined AC and DC power converter as described herein). In implementations, the method includes filtering an AC or DC electrical signal from a power source with an electromagnetic interference (EMI) filter; rectifying the electrical signal with a bridge rectifier coupled to the EMI filter; and adjusting one or more boost parameters of the electrical signal with a boost converter coupled to the bridge rectifier, wherein the bridge rectifier and the boost converter can be operated in an AC or DC mode based upon the electrical signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
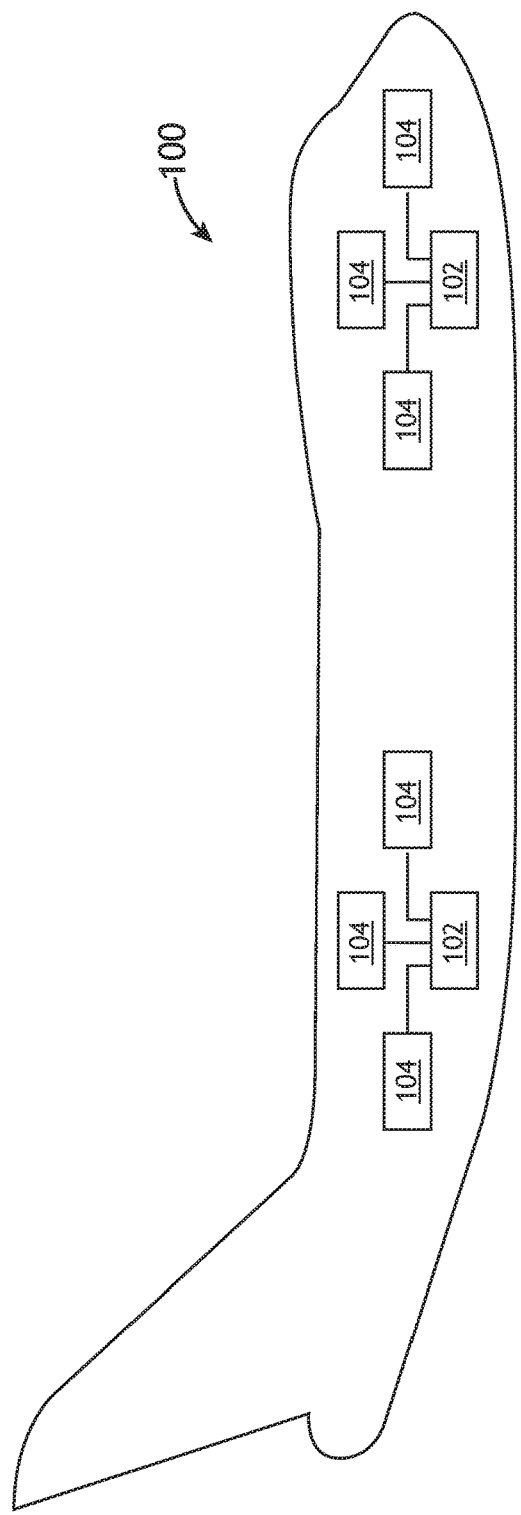
FIG. 1 is a block diagram illustrating an example environment in which a combined AC and DC power converter may be implemented, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a combined AC and DC power converter and systems and methods associated therewith. The power converter processes AC and DC signals using the same components. In some embodiments, the power converter includes or is coupled with components that automatically detect which type of power source the power converter is connected to, thereby facilitating seamless operation.

The wide operating frequency differences (e.g., DC vs. 50-60 Hz, 360-800 Hz, or any other AC frequency range) and wide voltage differences (e.g., 1-50 VDC vs. 100-500 VAC) of AC and DC networks have typically resulted in dramatically different power supply architectures. The example voltage and frequency ranges provided herein are for illustrative purposes and it is contemplated that the power converter described herein can operate at other voltages and frequencies. High current in DC networks and high voltages in AC networks impose different stresses on electrical components. However, by taking an untraditional approach on the DC power supply function, a common solution can be found to both design challenges using a single assembly. The power converter described herein enables a single product to work on multiple power networks while avoiding the typical size, weight and cost penalty towards doing so. It also serves to reduce development and qualification efforts by consolidating two program efforts into one.

FIG. 1 illustrates an example of an aircraft 100 environment in which a combined AC and DC power converter 200 as described herein can be implemented. The aircraft 100 can include one or more power sources 102 (e.g., AC and/or DC power sources, such as, but not limited to, 115 VAC and/or 28 VDC power sources, or the like). The power sources 102 can be configured to furnish electrical power signals to one or more devices 104 in the aircraft 100. The aircraft 100 environment illustrated in FIG. 1 is provided as an example implementation; however, it is contemplated that the power converter 200 and/or a device 104 that includes the power converter 200 can be implemented in a variety of other settings (e.g., in any other vehicle or facility that includes an AC and/or DC power network).

Figure 2:
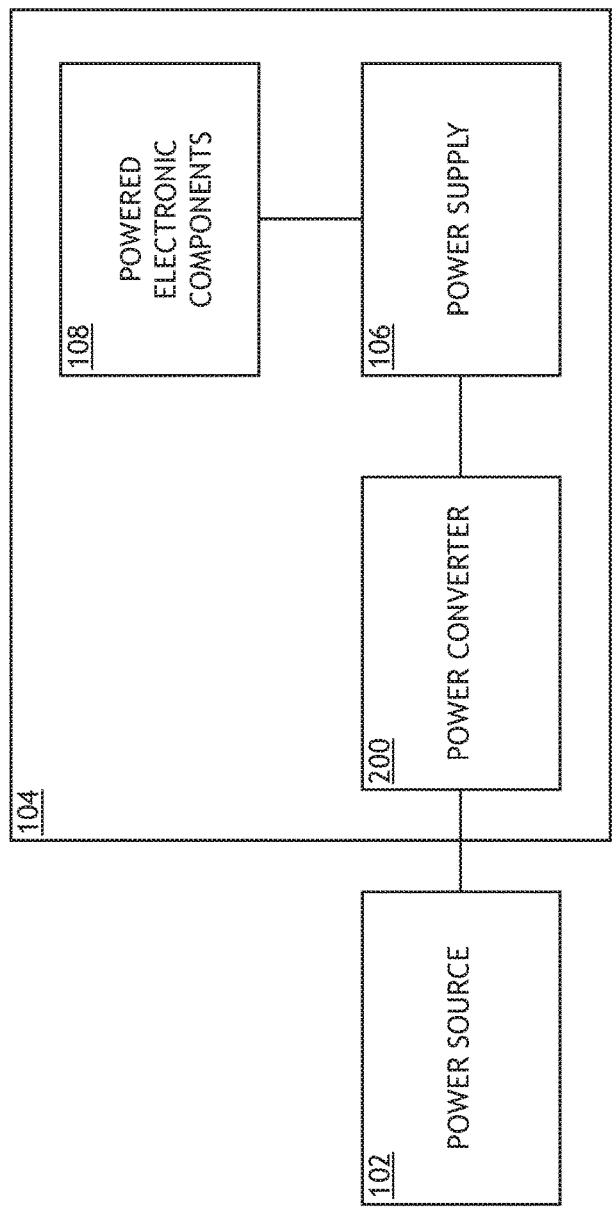
FIG. 2 is a block diagram illustrating the combined AC and DC power converter implemented within a device, in accordance with example embodiments of this disclosure.
Figure 3:
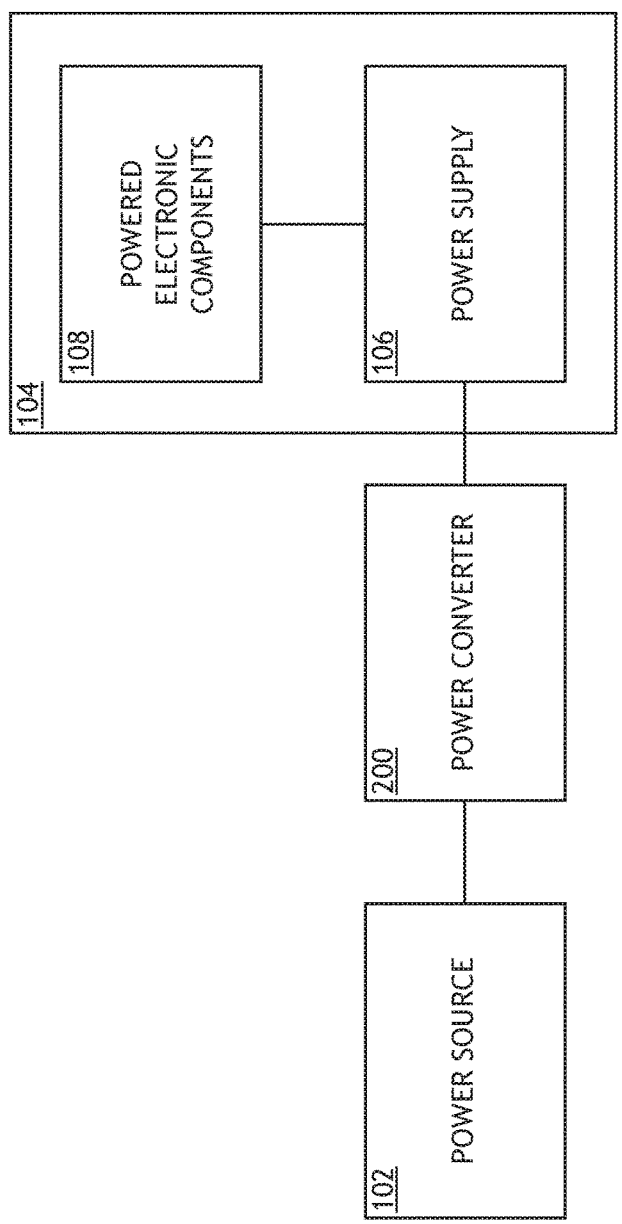
FIG. 3 is a block diagram illustrating the combined AC and DC power converter coupled to a device, in accordance with example embodiments of this disclosure.

As shown in FIGS. 2 and 3, respectively, the power converter 200 can be integrated within a device 104 or coupled to a device 104 (e.g., as a distinct component connected between the device 104 and the power source 102). In embodiments, the device 104 includes a power supply 106 coupled to the power converter 200. For example, the power converter 200 can be coupled to or can make up a portion of front-end circuitry of the power supply 106. The device 104 may further include one or more powered electronic components 108 (e.g., sensors, actuators, switches, transmitters, receivers, transceivers, I/O devices, or the like) that are coupled to the power supply 106.

Figure 4:
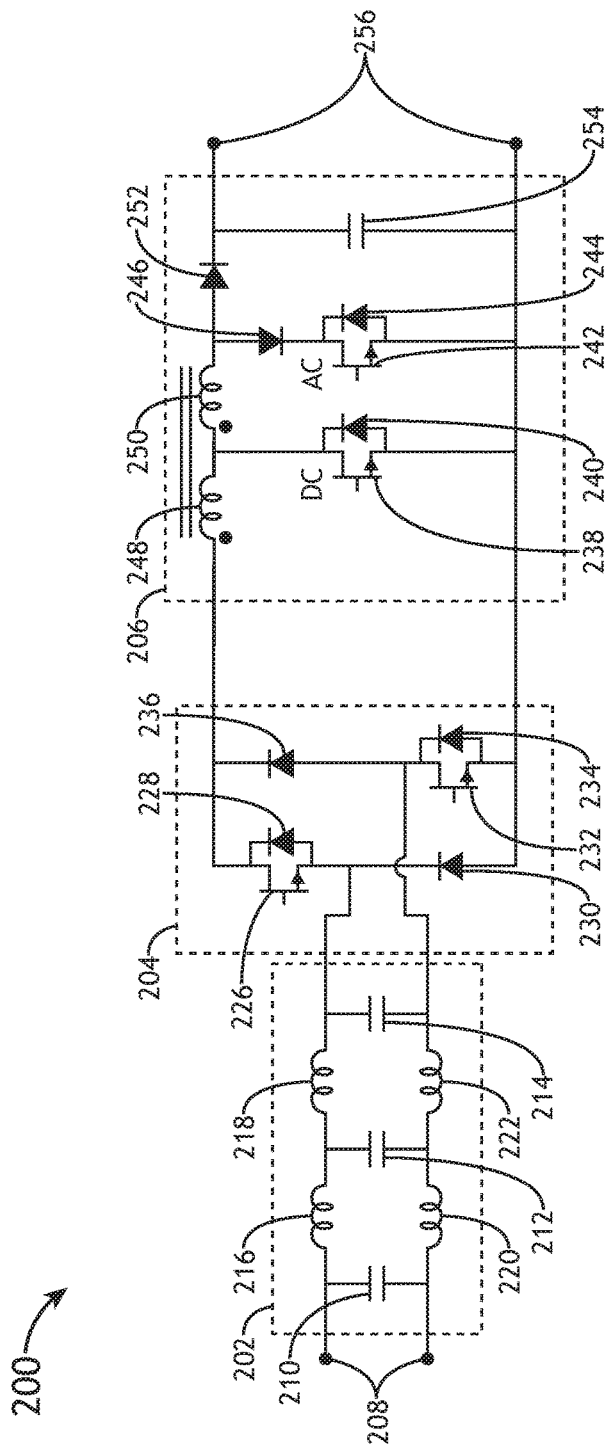
FIG. 4 is a circuit diagram of the combined AC and DC power converter, in accordance with example embodiments of this disclosure.
Figure 5:
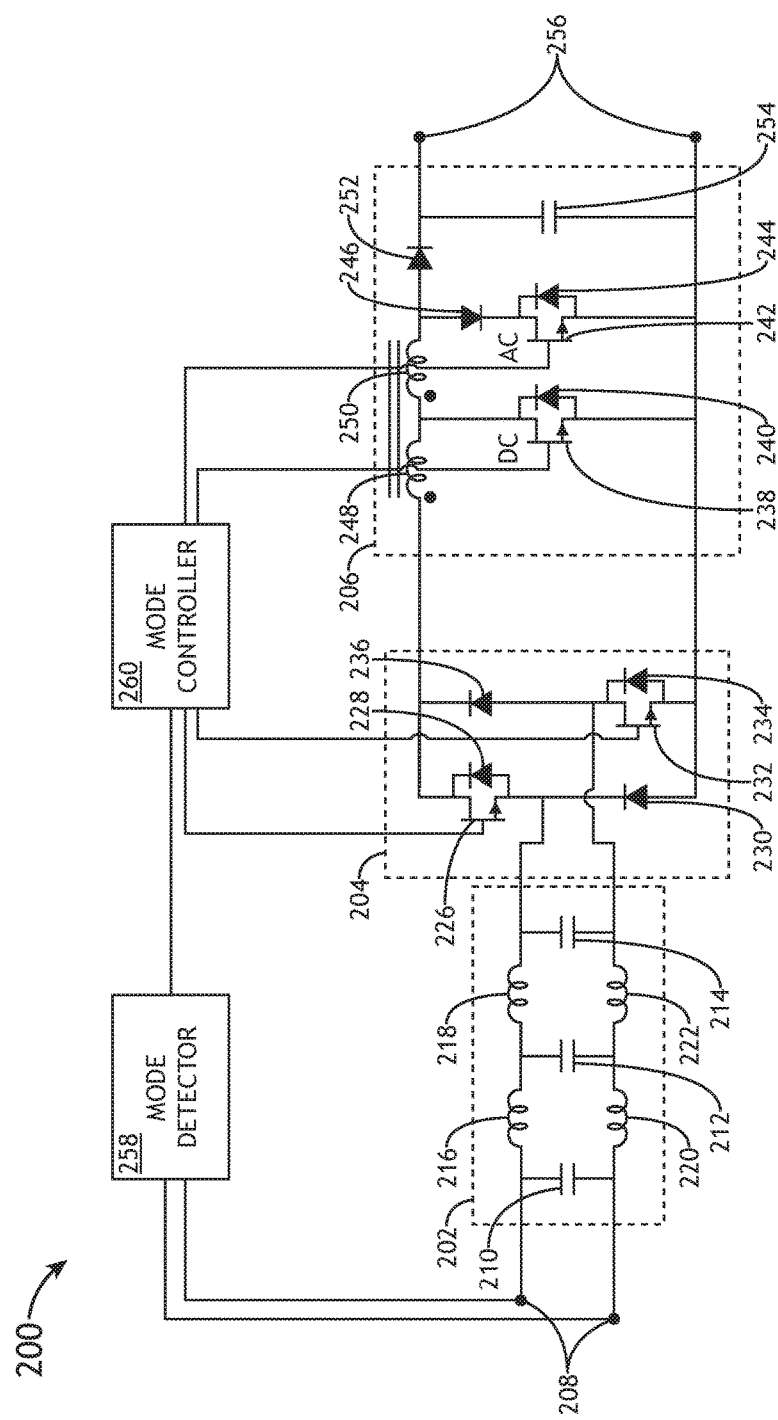
FIG. 5 is a circuit diagram of the combined AC and DC power converter, wherein the AC and DC power converter includes a mode detector and a mode controller, in accordance with example embodiments of this disclosure.

Example embodiments of the combined AC and DC power converter 200 are illustrated in FIGS. 4 and 5. In embodiments, the power converter 200 includes an electromagnetic interference (EMI) filter 202, a bridge rectifier 204, and a boost converter 206. The EMI filter 202 is configured to receive an electrical signal from a power source (e.g., power source 102) via input connectors 208 (e.g., pins, sockets, or the like). The electrical signal is then directed through the bridge rectifier 204 and the boost converter 206 to rectify the electrical signal and adjust one or more boost parameters (e.g., gain, boost power factor correction, etc.) for the signal.

In an embodiment, the EMI filter 202 includes at least one EMI filter stage including a first capacitor 210, a first inductor 216, and a second inductor 220, where a first terminal of the first capacitor 210 is coupled to an input connector 208 and to a first terminal of the first inductor 216, and a second terminal of the first capacitor 210 is coupled to another input connector 208 and to a first terminal of the second inductor 220. The EMI filter 202 may include one or more additional EMI filter stages. For example, in FIGS. 4 and 5, the EMI filter 202 is shown to include a second EMI filter stage including a second capacitor 212, a third inductor 218, and a fourth inductor 222, where a first terminal of the second capacitor 212 is coupled to a second terminal of the first inductor 216 and to a first terminal of the third inductor 218, and a second terminal of the second capacitor 212 is coupled to a second terminal of the second inductor 220 and to a first terminal of the fourth inductor 222. The EMI filter 202 can further include an output capacitor 214, for example, following the second filter stage, where a first terminal of the output capacitor 214 is coupled to a second terminal of the third inductor 218, and second terminal of the output capacitor 214 is coupled to a second terminal of the fourth inductor 222. Although a two-stage EMI filter 202 is shown, the EMI filter 202 can include any number of filter stages. The EMI filter 202 may also be implemented according to other EMI filter architectures without departing from the scope of this disclosure.

In embodiments, a single EMI filter (EMI filter 202) can be used for both systems. Due to the high-voltage AC power supply, only small values of capacitance are available. Due to the high-current DC power supply, small inductance values must be used (e.g., to reduce I2R losses). With a high-switching frequency boost PFC/coupled inductor boost stage, an EMI filter to support both systems can be realized with reasonable values of inductance/capacitance. The use of a single EMI filter vastly reduces the circuit card area required.

The bridge rectifier 204 is coupled to the EMI filter 202 and includes at least four diodes (e.g., diodes 228, 230, 234, and 236) arranged in a diode bridge configuration. In some embodiments, a first transistor 226 is in parallel with diode 228 and a second transistor 232 is in parallel with diode 234. These transistors 226 and 232 may improve efficiency in DC modes of operation, but they are not required and may be left out in other implementations. A first terminal of the first transistor 226 may be coupled to an input of the bridge rectifier 204 (between diodes 228 and 230), and a second terminal of the first transistor 226 may be coupled to an output of the bridge rectifier 204 (between diodes 228 and 236). Similarly, a first terminal of the second transistor 232 may be coupled to an input of the bridge rectifier 204 (between diodes 234 and 236), and a second terminal of the first transistor 226 may be coupled to an output of the bridge rectifier 204 (between diodes 230 and 234). The first and second transistors 226 and 232 are operable to selectively bypass diodes 228 and 234 (e.g., when operating in a DC mode). For example, in a DC mode of operation, the first and second transistors 226 and 232 can be turned on (e.g., by applying a high/low voltage to the respective transistor gates) so that the electrical signal travels through the transistors, thereby bypassing diodes 228 and 234.

In embodiments, the bridge rectifier 204 (often used for AC power supplies) is dual purposed into providing the reverse voltage protection function needed for DC power supplies. In some embodiments, the transistors 226 and 232 (e.g., MOSFETs) can be used to reduce conduction losses when operating in DC mode.

The boost converter 206 is coupled to the bridge rectifier 204 and includes a switched DC path and a switched AC path. The switched DC path includes a DC transistor 238. In some embodiments, the switched DC path also includes a diode 240 in parallel with or embodied by the DC transistor 238 (e.g., the DC transistor 238 can act as a switch and/or diode). The switched AC path includes an AC transistor 242 and one or more diodes or switching elements (e.g., diode/switch 246). In some embodiments, the switched AC path also includes a diode 244 in parallel with or embodied by the AC transistor 242 (e.g., the AC transistor 242 can act as a switch and/or diode).

In embodiments, the boost converter 206 further includes a first inductor 248 and a second inductor 250. The first inductor 248 has a first terminal coupled to an output of the bridge rectifier 204 and a second terminal coupled to the switched DC path (e.g., coupled to a first terminal of the DC transistor 238, where a second terminal of the DC transistor 238 is coupled to another output of the bridge rectifier 204). The second inductor 250 has a first terminal coupled to the switched DC path and to a second terminal of the first inductor 248, and the second inductor 250 has a second terminal coupled to the switched AC path. In embodiments, inductors 248 and 250 are wound on the same magnetic core and are part of a single mechanical structure. The inductors 248 and 250 are also magnetically coupled.

In some embodiments, the switched AC path includes a diode 246 (e.g., a Schottky diode, a silicon diode, or any other switching element configured as a bi-directional switch) in series with the AC transistor 242, where a first terminal of diode 246 is coupled to the second terminal of the second inductor 250, and a second terminal of diode 246 is coupled to the AC transistor 242. In some embodiments, the boost converter 206 further includes a diode 252 (e.g., a Schottky diode, a silicon diode, or any other switching element configured as a rectifying device) positioned before the output of the boost converter 206. Diode 252 may have a first terminal coupled to the second terminal of the second inductor 250 and to the first terminal of diode 246, and diode 252 may have a second terminal coupled to an output capacitor 254. In embodiments, a first terminal of the output capacitor 254 is coupled to the second terminal of diode 252, and a second terminal of the output capacitor 254 is coupled to the switched DC path and the switched AC path. The terminals of the output capacitor 254 can also be coupled to output connectors 256 (e.g., pins, sockets, or the like) of the power converter 200.

The boost converter 206, as described above, is effectively a coupled inductor boost converter and a power factor correction (PFC) boost converter combined into a single stage. This approach allows the largest and most expensive portion of either subsystem (inductors 248 and 250) to be shared for both power processing subsystems (e.g., for the DC switched path and the AC switched path).

In embodiments, the output capacitor 254 includes or is coupled to a high-voltage capacitor bank after the boost converter 206. This high-voltage energy storage bank buffers the design of the downstream circuits from the differences of the input voltage network. All circuits after this point can be the same as they normally would be for an AC or DC power supply. Additionally, using a high-voltage capacitor storage bank is particularly advantageous for the DC power supply function since it allows small and inexpensive storage capacitors to be used for play through time requirements.

In some embodiments, bridge rectifier transistors 226, 232, DC transistor 238, and/or AC transistor 242 are MOSFETs. In other embodiments, another transistor type (e.g., BJTs) or combination of transistor types can be used. In embodiments, the AC switch element (transistor 242) may be bi-directional to prevent reverse current due to the winding coupling. In embodiments where the AC switch element is bi-directional, diode 246 may be removed from (or not present in) the boost converter 206 circuitry.

Further, as shown in FIG. 5, the power converter 200 may include or may be coupled to a mode controller 260 that is configured to enable respective ones of the transistors (e.g., by applying a high or low gate voltage signal) based upon a DC mode or an AC mode of operation. In embodiments, the AC transistor and the DC transistors are controlled through an output of a pulse width modulator (PWM) that is included in or coupled to the mode controller 260. The mode controller 260 may include a programmable logic circuit (PLC), microprocessor, microcontroller, field programmable gate array (FPGA), circuitry, or other processing system. In some embodiments, the mode controller 260 can execute one or more software programs embodied in a non-transitory computer readable medium that implement techniques described herein. The mode controller 260 is not limited by the materials from which it is formed, or the processing mechanisms employed therein and, as such, can be implemented via semiconductor(s) and/or transistors (e.g., using electronic integrated circuit (IC) components), and so forth.

In embodiments, the mode controller 260 is coupled to the DC transistor 238 and the AC transistor 242, and the mode controller 260 is configured to enable respective ones of the transistors based upon a DC mode or an AC mode of operation. For example, the mode controller 260 may be configured to enable the DC transistor when the mode controller 260 is operating in the DC mode and/or configured to enable the AC transistor when the mode controller 260 is operating in the AC mode. In some embodiments, the mode controller 260 can be configured to disable the AC transistor 242 and enable transistor 226, transistor 232, and the DC transistor 238 when the mode controller 260 is operating in the DC mode. In some embodiments, the mode controller 260 can also be configured to enable the AC transistor 242 and disable transistor 226, transistor 232, and the DC transistor 238 when the mode controller is operating in the AC mode. The transistors can be controlled by at least one PWM that is integrated within the structure/circuitry of or coupled to the mode controller 260. For example, the mode controller 260 can be configured to transmit control signals to the PWM that cause the PWM to selectively enable/disable the transistors.

In some embodiments, the power converter 200 also includes a mode detector 258. The mode detector 258 may be integrated with the mode controller 260. For example, the mode controller 260 can include circuitry or logic for determining whether the electrical signal is an AC signal or a DC signal. In other embodiments, the mode detector 258 can be coupled to the mode controller 260 and configured to indicate whether an AC signal or a DC signal is detected to the mode controller 260. In some embodiments, the mode detector 258 includes a timing circuit for detecting whether a number of clock cycles of the electrical signal exhibit alternating current or direct current.

The mode controller 260 may be configured to enable/disable respective ones of the transistors based upon whether an AC signal or a DC signal is detected by the mode detector 258. In other embodiments, the mode controller 260 can be set to an AC mode or a DC mode manually (e.g., based upon a user input or switch setting). Further, although a single mode controller 260 is described herein, the mode controller 260 can be a plurality of mode controllers 260 (e.g., for controlling respective transistors or groups of transistors).

Figure 6A:
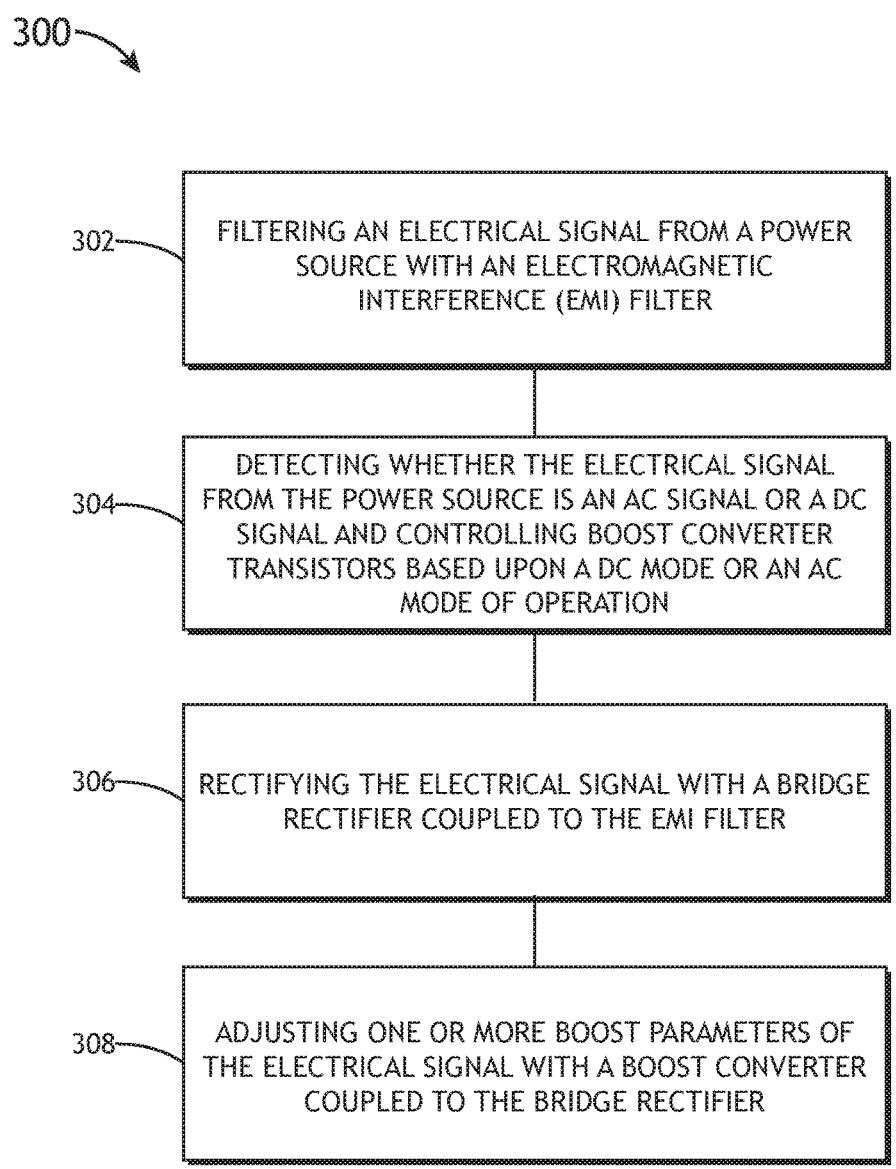
FIG. 6A is a flow diagram illustrating an example implementation of a method for converting power from AC and DC power sources with combined AC and DC power conversion circuitry, for example, with the power converter illustrated in any of FIGS. 1 through 5, or a combination thereof.
Figure 6B:
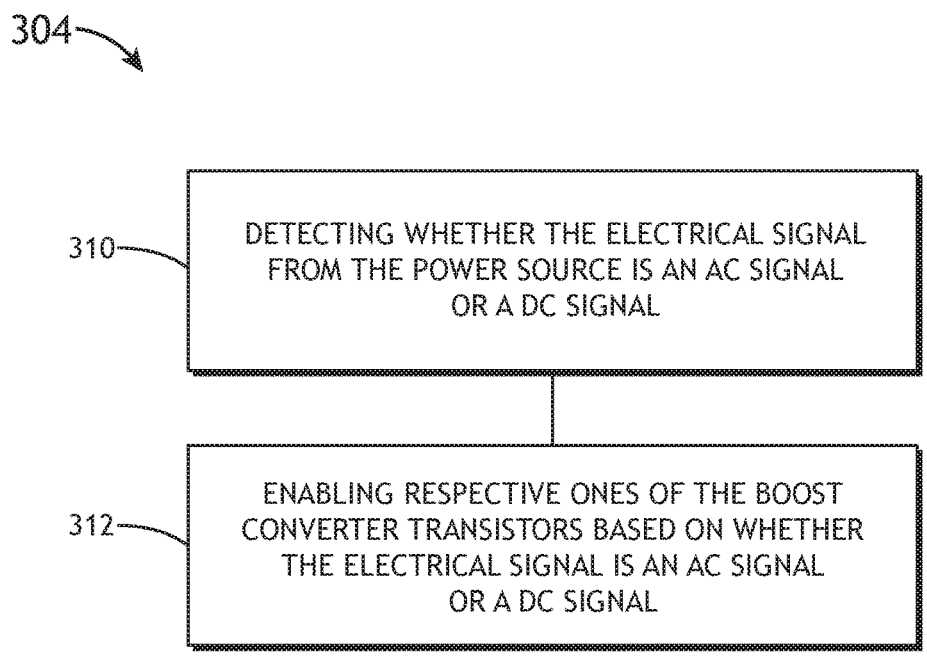
FIG. 6B is a flow diagram further illustrating an example implementation of the method illustrated in FIG. 6A.

FIGS. 6A and 6B illustrate an example implementation of a method 300 for converting power from AC and DC power sources with combined AC and DC power conversion circuitry. In general, operations of disclosed processes (e.g., method 300) may be performed in an arbitrary order, unless otherwise provided herein.

In implementations, the method 300 includes filtering an AC or DC electrical signal received from a power source with an EMI filter 202 (block 302). The electrical signal is then directed into a bridge rectifier 204 coupled to the EMI filter 202 (block 306). The method 300 further includes adjusting one or more boost parameters of the electrical signal with a boost converter 206 coupled to the bridge rectifier 204 (block 308).

The bridge rectifier 204 and the boost converter 206 can be operated in an AC or DC mode based upon the electrical signal. For example, the method 300 can further include detecting whether the electrical signal from the power source is an AC signal or a DC signal and controlling boost converter transistors based upon a DC mode or an AC mode of operation (block 304). As shown in FIG. 6B, block 304 may include detecting whether the electrical signal from the power source is an AC signal or a DC signal (block 310) and enabling respective ones of the boost converter transistors (e.g., AC transistor 242 or DC transistor 238) based on whether the electrical signal is an AC signal or a DC signal (block 312)

The method 300 may further include any step or operation implied or required by the embodiments of the power converter 200 described herein. The power converter 200 can also include any additional component or functionality expressed or implied by the method 300.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A power converter for alternating current (AC) and direct current (DC) power sources, the power converter comprising: an electromagnetic interference (EMI) filter configured to receive an electrical signal from a power source; a bridge rectifier coupled to the EMI filter, the bridge rectifier including at least four diodes arranged in a diode bridge configuration, the bridge rectifier further including a first transistor and a second transistor in parallel with respective diodes of the bridge rectifier; a boost converter coupled to the bridge rectifier, the boost converter including a switched DC path and a switched AC path, the switched DC path including a DC transistor, the switched AC path including an AC transistor; and a mode controller configured to enable respective ones of the AC and DC transistors based upon a DC mode or an AC mode of operation, wherein the mode controller is configured to disable the AC transistor and enable the DC transistor and the first and second transistors of the bridge rectifier when the mode controller is operating in the DC mode, and wherein the mode controller is configured to enable the AC transistor and disable the DC transistor and the first and second transistors of the bridge rectifier when the mode controller is operating in the AC mode.

2. The power converter of claim 1, wherein the boost converter further includes a first inductor with a first terminal and a second terminal, wherein the first terminal of the first inductor is coupled to the bridge rectifier, and the second terminal of the first inductor is coupled to the switched DC path.

3. The power converter of claim 2, wherein the boost converter further includes a second inductor with a first terminal and a second terminal, wherein the first terminal of the second inductor is coupled to the switched DC path and the second terminal of the first inductor, and the second terminal of the second inductor is coupled to the switched AC path, and wherein the first inductor and the second inductor are wound on a shared magnetic core with a shared mechanical structure.

4. The power converter of claim 3, wherein the switched AC path further includes a first diode or switch with a first terminal and a second terminal, wherein the first terminal of the first diode or switch is coupled to the second terminal of the second inductor, and the second terminal of the first diode or switch is coupled to the AC transistor.

5. The power converter of claim 4, wherein the boost converter further includes a second diode or switch with a first terminal and a second terminal, wherein the first terminal of the second diode or switch is coupled to the second terminal of the second inductor and the first terminal of the first diode or switch, and the second terminal of the second diode or switch is coupled to an output capacitor.

6. The power converter of claim 5, wherein a first terminal of the output capacitor is coupled to the second terminal of the second diode or switch, and a second terminal of the output capacitor is coupled to the switched DC path and the switched AC path.

7. The power converter of claim 1, wherein the AC transistor and the DC transistor are controlled through an output of a pulse width modulator (PWM).

8. A device, comprising: a power converter including: an electromagnetic interference (EMI) filter configured to receive an electrical signal from a power source; a bridge rectifier coupled to the EMI filter, the bridge rectifier including at least four diodes arranged in a diode bridge configuration, the bridge rectifier further including a first transistor and a second transistor in parallel with respective diodes of the bridge rectifier; a boost converter coupled to the bridge rectifier, the boost converter including a switched DC path and a switched AC path, the switched DC path including a DC transistor, the switched AC path including an AC transistor, and a mode controller configured to enable respective ones of the AC and DC transistors based upon a DC mode or an AC mode of operation, wherein the mode controller is configured to disable the AC transistor and enable the DC transistor and the first and second transistors of the bridge rectifier when the mode controller is operating in the DC mode, and wherein the mode controller is configured to enable the AC transistor and disable the DC transistor and the first and second transistors of the bridge rectifier when the mode controller is operating in the AC mode; a power supply coupled to the power converter; and one or more powered electronic components coupled to the power supply.

9. The device of claim 8, wherein the boost converter further includes a first inductor with a first terminal and a second terminal, wherein the first terminal of the first inductor is coupled to the bridge rectifier, and the second terminal of the first inductor is coupled to the switched DC path.

10. The device of claim 9, wherein the boost converter further includes a second inductor with a first terminal and a second terminal, wherein the first terminal of the second inductor is coupled to the switched DC path and the second terminal of the first inductor, and the second terminal of the second inductor is coupled to the switched AC path, and wherein the first inductor and the second inductor are wound on a shared magnetic core with a shared mechanical structure.

11. The device of claim 10, wherein the switched AC path further includes a first diode or switch with a first terminal and a second terminal, wherein the first terminal of the first diode or switch is coupled to the second terminal of the second inductor, and the second terminal of the first diode or switch is coupled to the AC transistor.

12. The device of claim 11, wherein the boost converter further includes a second diode or switch with a first terminal and a second terminal, wherein the first terminal of the second diode or switch is coupled to the second terminal of the second inductor and the first terminal of the first diode or switch, and the second terminal of the second diode or switch is coupled to an output capacitor.

13. The device of claim 12, wherein a first terminal of the output capacitor is coupled to the second terminal of the second diode or switch, and a second terminal of the output capacitor is coupled to the switched DC path and the switched AC path.

14. The device of claim 8, wherein the AC transistor and the DC transistor are controlled through an output of a pulse width modulator (PWM).

15. A method of converting power for alternating current (AC) and direct current (DC) power sources, the method comprising:
  filtering an electrical signal from a power source with an electromagnetic interference (EMI) filter;
  rectifying the electrical signal with a bridge rectifier coupled to the EMI filter, the bridge rectifier including at least four diodes arranged in a diode bridge configuration, the bridge rectifier further including a first transistor and a second transistor in parallel with respective diodes of the bridge rectifier;
  adjusting one or more boost parameters of the electrical signal with a boost converter coupled to the bridge rectifier, the boost converter including a switched DC path and a switched AC path, the switched DC path including a DC transistor, the switched AC path including an AC transistor,
  detecting whether the electrical signal from the power source is an AC signal or a DC signal;
  disabling the AC transistor while enabling the DC transistor and the first and second transistors of the bridge rectifier when the detected electrical signal is an AC signal; and
  enabling the AC transistor while disabling the DC transistor and the first and second transistors of the bridge rectifier when the detected electrical signal is an DC signal.

* * * * *